United States Patent [19]

Dotson

[11] Patent Number: 5,466,723
[45] Date of Patent: Nov. 14, 1995

[54] RADIATION CURABLE ADHESIVE FOR LAMINATING A LINEFORM IMAGE TO A LENTICULAR ARRAY SHEET

[75] Inventor: Billy R. Dotson, Spencerport, N.Y.

[73] Assignee: Eastman Kodak Company, Rochester, N.Y.

[21] Appl. No.: 323,966

[22] Filed: Oct. 17, 1994

[51] Int. Cl.$^6$ .............. G03C 7/14; C09J 175/16; C09J 175/06
[52] U.S. Cl. .............. 522/96; 522/97; 522/103; 522/107; 522/182; 355/22; 355/77
[58] Field of Search .............. 522/96, 103, 107, 522/182, 97; 355/22, 77

[56] References Cited

U.S. PATENT DOCUMENTS

| | | | |
|---|---|---|---|
| 4,571,361 | 2/1986 | Kawaguchi et al. | 428/328 |
| 4,623,594 | 11/1986 | Keough | 428/500 |
| 4,695,508 | 9/1987 | Kageyama et al. | 428/261 |
| 4,721,648 | 1/1988 | Kleine-Doepke et al. | 522/33 |
| 4,722,947 | 2/1988 | Thanawalla et al. | 522/120 |
| 4,920,157 | 4/1990 | Schulz et al. | 522/96 |
| 4,957,947 | 9/1990 | Chen et al. | 522/66 |
| 4,965,117 | 10/1990 | Lautenschlaeger et al. | 428/182 |
| 5,068,262 | 11/1991 | Noguchi | 522/95 |
| 5,183,833 | 2/1993 | Fisher et al. | 522/120 |
| 5,276,478 | 1/1994 | Morton | 355/22 |

*Primary Examiner*—Susan W. Berman
*Attorney, Agent, or Firm*—Robert A. Gerlach

[57] ABSTRACT

A radiation curable adhesive composition which comprises from 15 to 85 percent by weight of beta-carboxyethyl acrylate and from 85 to 15 percent by weight of 2-phenoxyethyl acrylate based on the total weight of the composition.

7 Claims, No Drawings

RADIATION CURABLE ADHESIVE FOR LAMINATING A LINEFORM IMAGE TO A LENTICULAR ARRAY SHEET

BACKGROUND OF THE INVENTION

FIELD ON THE INVENTION

The invention relates to the manufacture of images which provide a visual impression of three-dimensional depth. More particularly, the invention is related to laminating a lineiform image sheet to a lenticular array sheet using a radiation-curable adhesive.

Lenticular arrays or sheets are a known means for giving certain images the appearance of depth. Images are created which comprise an array of parallel image lines which form a composite picture or lineiform image of a scene viewed from different angles. A lenticular sheet comprising an array of contiguous, parallel, elongated lenticules is positioned in front of the lineiform image, so that the lenticules cause each eye of the viewer to see different elements or views of the overall image. Thus, the viewer will interpret the result as depth of field. Depth images of this type have been created by exposing a photographic film through a lenticular array sheet and then developing the latent image. If the lenticular array is bonded to the photographic medium before exposure, then the lineiform image and the array are automatically aligned. These types of images generally are not of high three-dimensional quality and do not lend themselves to electronic image manipulation before the print is finalized.

Commonly assigned U.S. Pat. No. 5,276,478 describes an improved apparatus and methods for making depth images in which the lineiform image is formed electronically, the spacing between image lines being controlled to provide improved alignment with the lenticules of a lenticular array sheet. A recorded image sheet or medium bearing a lineiform image suitable for viewing by either transmitted or reflected light contains sets of image lines that are produced optically or electronically to provide the composite lineiform image. The image sheet typically is rather thin and quite flexible but may be stiff or rigid. A very thin layer of adhesive, typically a contact adhesive provided on the back side of a lenticular array sheet or on the surface of the image sheet, joins the image and array sheets at their smooth, interfaced surfaces. The lenticular array sheet may be made from a suitable flexible plastic and typically has a thickness of about 0.05 inch (1.27 mm). For best effect, the parallel lenticules of the array sheet must be positioned with one lenticule for each set of image lines. When viewed, one image line of each set is viewed by each eye of the observer, so that the observed lines merge to create a complete scene with perceived depth of field. The eyes see the image via light rays through lenticules as a series of simultaneous image lines or view slices. The scenes provided by the first and second views provide the depth perspective.

While such depth image systems are capable of displaying images with striking appearances of three dimensions, efficiency of production and the quality of the image seen by the observer are dependent greatly on defect-free lamination of the image and array sheets and on quick, accurate alignment of the image lines and the lenticules. When contact or pressure sensitive adhesive is used between the two sheets, achieving accurate alignment can be quite difficult, particularly for rather large images. Other adhesives such as hot melts, two-part epoxies and heat-reactive adhesives have been used with mixed success. Such adhesives often are too viscous or bond instantly on contact and prevent the sheets from being properly laminated and accurately aligned. Some adhesives cure too slowly for efficient production use. Variations in the thickness of the adhesive layer also have led to dimensional distortions and poor alignment between the image sheet and the lenticular sheet. Some adhesives impart heat or stress to the sheets which can cause permanent distortion of the viewed image. Regardless of the type of adhesive used, bubbles of air can become trapped between the sheets during lamination, thus leading to defects in the final image. Variations in thickness of the array sheets can contribute to entrapment of air between the sheets during lamination, since the array sheet may not fully contact the image sheet in the lamination nip. Also, providing and maintaining correct alignment of the sheets during curing of the adhesive has been difficult to accomplish using known techniques for assembling depth images.

Commonly assigned co-pending application, Ser. No. 278,436, filed Jul. 21, 1994, describes a method and apparatus useful for assembling or laminating a depth image from an image sheet bearing a lineiform image and a lenticular array sheet having lenticules parallel to the lineiform image and a layer of adhesive between the image and array sheets.

Once alignment has been achieved, means are provided for curing the adhesive to ensure permanent alignment of the array and image. The adhesive may be curable by ultraviolet light, so that the means for curing comprises a source of ultraviolet light. The ultraviolet light may be directed through the array sheet or may be transmitted through the image sheet. The source of ultraviolet light may have a longitudinal axis essentially parallel to the lenticules, and the apparatus may include means for moving the vacuum platen and the means for gripping past the ultraviolet light source. The means for curing alternatively may comprise an electron beam source.

There is a need for an improved adhesive that provides optical clarity, controlled viscosity, and substantially instant cure on demand.

SUMMARY OF THE INVENTION

This invention provides an improved adhesive for laminating a lineiform image sheet to a lenticular array sheet, the adhesive comprising from 15 to 85 percent by weight of beta-carboxyethyl acrylate and from 85 to 15 percent by weight of 2-phenoxyethyl acrylate based on the total weight of the composition.

DESCRIPTION ON PREFERRED EMBODIMENTS

The invention contemplates an adhesive comprising the percentage of beta-carboxyethyl acrylate and 2-phenoxyethyl acrylate stated above. Preferably, a viscosity control additive is also present in the adhesive, and when such is the case, the beta-carboxyethyl acrylate is employed preferably in an amount of from 15 to 50 percent by weight and most preferably in an amount of from 25 to 35 percent and the 2-phenoxyethyl acrylate is preferably employed in an amount of 10 to 50 percent by weight and most preferably in an amount of from 25 to 40 percent by weight. The composition preferably also includes an effective amount of a photoinitiator which upon being exposed to ultraviolet light causes the adhesive to substantially immediately polymerize. Alternatively, the curing of the adhesive can be brought about by utilizing electron beam exposure and this does not require the presence of a photoinitiator because of the higher energy of the electron beam. When a photoinitiator is employed in the adhesive composition, it is generally used in an amount of from about 2 to about 10 parts per 100 parts of the adhesive, preferably from about 3 to 6 parts.

Any suitable photoinitiator may be employed in the adhesive compositions in accordance with this invention such as 2-hydroxy-2-methyl-1-phenyl-1-propanone sold by Ciba-Geigy under the grade designation Darocur 1173, 1-hydroxycyclohexylphenyl ketone, 2-benzyl-2-dimethylamino-1-(4-morpholinophenyl)-butan-1-one, 2,2-dimethoxy-2-phenylacetophenone, 2-methyl-1-[4-(methylthio)phenyl]-2-(4-morpholinyl)-1-propanone, sold by Ciba-Geigy under the grade designation Irgacure 184, 369, 651, and 907 respectively. Other suitable photoinitiators are set forth in U.S. Pat. Nos. 4,957,947 and 5,068,262, both incorporated herein by reference.

In a preferred embodiment, a viscosity control additive is present in the adhesive composition. The viscosity control additive is present for the purpose of ease of application of the adhesive composition to either the lineiform image sheet or the lenticular array sheet and also aids in the assembly of the two members in order that alignment can be achieved prior to causing the cure of the adhesive. The presence of the viscosity control additive also increases the green strength of the adhesive which is important prior to curing of the adhesive or maintaining the lineiform image sheet and the lenticular array sheet in constant and uniform contact. The viscosity control additive is present in the adhesive composition in an amount of from 30 to 70 percent by weight, and preferably in an amount of from 45 to 55 percent by weight.

Any suitable oligomeric material that is compatible with the monomers set forth above, that increases the viscosity of the adhesive composition for the purpose of enabling ready assembly of the lineiform image sheet and the lenticular array sheet may be employed so long as the oligomer contains ethylenically unsaturated sites that will react with the unsaturated group present in the two monomers set forth above. Suitable materials include end-capped acrylate moieties present on such oligomers as epoxy-acrylates, polyester-acrylates, acrylate oligomers, polyether acrylates, polyether-urethane acrylates, polyester-urethane acrylates, and the like. Other suitable oligomeric materials are described in U.S. Pat. Nos. 4,571,361 and 4,623,594, both of which are incorporated herein by reference. Polyurethanes, end-capped with acrylate moieties such as, hydroxyethyl acrylate are preferred. Further, it is preferred that the polyurethane oligomer is prepared utilizing an aliphatic diisocyanate such as hexamethylene diisocyanate, cyclohexane diisocyanate, diisocyclohexylmethane diisocyanate, isophorone diisocyanate, and the like. Isophorone diisocyanate is a preferred material. A most preferred polyurethane is a polyester polyurethane prepared from adipic acid and neopentyl glycol. The polyester together with a further quantity of neopentyl glycol is reacted with an excess of isophorone diisocyanate and then the isocyanate groups on the terminal portion of the molecule are reacted with hydroxyl ethyl acrylate. A suitable material is one sold under the grade designation CN966-H90 by Sartomer Corporation.

The adhesive composition as described is coated onto either the lineiform image sheet or the lenticular array sheet in accordance with the information disclosed in the above-mentioned co-pending application Ser. No. 278,436 filed Jul. 21, 1994 which is entirely incorporated herein by reference.

Lenticular array sheets may be made from any suitable materials such as, polymethyl-methacrylate, polyesters such as, polyethylene terephthalate, polyethylene-cyclohexane-dimethylol terephthalate, polystyrene, polycarbonates, cellulose triacetate, and the like. Methylmethacrylate and the polyesters mentioned above are preferred.

The invention will further be described by the following examples:

EXAMPLES 1–4

A series of adhesives were prepared by mixing beta-carboxyethyl acrylate (CEA), 2-phenoxyethyl acrylate (PEA), and a polyurethane oligomer containing ethylenical unsaturation sold by Sartomer Corporation under the grade designation CN966-H90. About four parts of 2-hydroxy-2-methyl-1-phenylpropan-1-one were added to the adhesive mixture. This composition was coated onto the emulsion surface of a lineiform image sheet and drawn down with a wire wound rod for the purpose of applying a uniform thickness of about 6 micrometers. The lenticular array sheet is superimposed over the lineiform image sheet and aligned and then exposed to ultraviolet light to cure the adhesives. The results of different runs utilizing varying percentages of the components employed are set forth in Table 1.

TABLE 1

| Example No. | CN966-490 | PEA | CEA | Viscosity CP |
|---|---|---|---|---|
| 1 | 45 | 38.5 | 16.5 | 1300 |
| 2 | 50 | 35 | 15 | 1920 |
| 3 | 55 | 31.5 | 13.5 | 2645 |
| 4 | 55 | 22.5 | 22.5 | 3150 |

In each instance, the bond strength of the lineiform image sheet to the lenticular array sheet was satisfactory as determined by a physical manual test of an attempt to peel the two apart. Further, the clarity of the bond was so clear as to be not discernible by a careful, visual inspection.

What is claimed is:

1. In a process for laminating a lineiform image to a lenticular array sheet the improvement which comprises bonding a lineiform image to a lenticular array sheet with a radiation curable composition which comprises from 50 to 15 percent by weight of beta-carboxyethyl acrylate and from 50 to 15 percent by weight of 2-phenoxyethylacrylate and from 30 to 70 percent by weight of a viscosity control additive, the viscosity control additive being an oligomer containing ethylenically unsaturated sites, based on the total weight of the composition.

2. The process of claim 1 wherein a photoinitiator is present.

3. The process of claim 1 wherein the viscosity control additive is present in an amount of from 45 to 55 percent by weight, the beta-carboxyethyl acrylate is present in an amount of 25 to 35 percent by weight and the 2-phenoxyethyl acrylate is present in an amount of from 25 to 40 percent by weight.

4. The process of claim 1 wherein the viscosity control additive is an acrylate oligomer.

5. The process of claim 4 wherein the acrylate oligomer is a polyesterurethane acrylate.

6. The process of claim 5 wherein the polyesterurethane is the reaction product of an adipic acid-neopentyl glycol polyester, a neopentyl glycol chain extending agent and an aliphatic diisocyanate.

7. The process of claim 5 wherein the aliphatic diisocyanate is isophorone diisocyanate.

* * * * *